US009915951B2

(12) United States Patent
Mei et al.

(10) Patent No.: US 9,915,951 B2
(45) Date of Patent: Mar. 13, 2018

(54) DETECTION OF OVERHANGING OBJECTS

(71) Applicant: Toyota Motor Engineering & Manufacturing North America, Inc., Erlanger, KY (US)

(72) Inventors: Xue Mei, Ann Arbor, MI (US); Katsuhiro Sakai, Ann Arbor, MI (US); Nobuhide Kamata, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 146 days.

(21) Appl. No.: 14/979,462

(22) Filed: Dec. 27, 2015

(65) Prior Publication Data

US 2017/0185089 A1    Jun. 29, 2017

(51) Int. Cl.
*G05D 1/00* (2006.01)
*G05D 1/02* (2006.01)
(Continued)

(52) U.S. Cl.
CPC .......... *G05D 1/0257* (2013.01); *G01S 13/931* (2013.01); *G01S 17/936* (2013.01); *G05D 1/0088* (2013.01); *G01S 2013/9342* (2013.01)

(58) Field of Classification Search
CPC ... G05D 1/0257; G01S 17/936; G01S 13/931; G01S 2013/9342
(Continued)

(56) References Cited

U.S. PATENT DOCUMENTS 8,589,014 B2   11/2013   Fairfield et al.
9,164,511 B1   10/2015   Ferguson et al.
(Continued)

FOREIGN PATENT DOCUMENTS

JP    11149557      6/1999
JP    2009301400 A  12/2009
JP    2012238151 A  12/2012

OTHER PUBLICATIONS

Petrovskaya et al., "Model Based Vehicle Detection and Tracking for Autonomous Urban Driving", retrieved from the Internet: <http://cs.stanford.edu/group/manips/publications/pdfs/Petrovskaya_2009_AURO.pdf>, [retrieved Apr. 12, 2016], published online Apr. 1, 2009 (17 pages).
(Continued)

*Primary Examiner* — Thomas G Black
*Assistant Examiner* — Luke Huynh
(74) *Attorney, Agent, or Firm* — Christopher G. Darrow; Darrow Mustafa PC

(57) ABSTRACT

An autonomous vehicle can encounter an external environment in which an object overhangs a current road of the autonomous vehicle. For example, the branch of a tree may overhang the road. Such an overhanging object can be detected and suitable driving maneuvers for the autonomous vehicle can be determined. Sensor data can be acquired from at least a forward portion of the external environment. One or more floating obstacle candidates can be identified based on the acquired sensor data. The identified one or more floating obstacle candidates can be filtered to remove any floating obstacle candidates that do not meet one or more predefined parameters. A driving maneuver for the autonomous vehicle can be determined at least partially based on a height clearance between the autonomous vehicle and floating obstacle candidates that remain after being filtered
(Continued)

out. The autonomous vehicle can be caused to implement the determined driving maneuver.

20 Claims, 4 Drawing Sheets

(51) Int. Cl.
  *G01S 17/93* (2006.01)
  *G01S 13/93* (2006.01)
(58) Field of Classification Search
  USPC .......................................................... 701/23
  See application file for complete search history.

(56) References Cited

U.S. PATENT DOCUMENTS

| | | | |
|---|---|---|---|
| 9,216,745 B2 | 12/2015 | Beardsley et al. | |
| 9,432,929 B1 | 8/2016 | Ross et al. | |
| 2012/0310466 A1 | 12/2012 | Fairfield et al. | |
| 2012/0316725 A1* | 12/2012 | Trepagnier | G01S 17/023 701/26 |
| 2014/0139676 A1 | 5/2014 | Wierich | |
| 2014/0330456 A1* | 11/2014 | Lopez Morales | G06Q 10/08355 701/3 |
| 2015/0045994 A1 | 2/2015 | Krishna et al. | |
| 2015/0272413 A1* | 10/2015 | Miyake | A47L 11/38 701/23 |
| 2015/0334269 A1 | 11/2015 | Yokota et al. | |
| 2016/0221500 A1* | 8/2016 | Sakai | B60Q 9/008 |

OTHER PUBLICATIONS

Petrovskaya, "Towards Dependable Robotic Perception", A Dissertation Submitted to the Department of Computer Science and the Committee on Graduate Studies of Stanford University, Jun. 2011 (226 pages).
Vu et al., "Online Localization and Mapping with Moving Object Tracking in Dynamic Outdoor Environments", IEEE Intelligent Vehicles Symposium, Istanbul, Turkey, Jun. 13-15, 2007, pp. 190-195 (6 pages).
Montemerlo et al., "Junior: The Stanford Entry in the Urban Challenge", retrieved from the Internet: <http://robots.stanford.edu/papers/junior08.pdf>, [retrieved Apr. 12, 2016], undated (31 pages).
Coue et al., "Bayesian Occupancy Filtering for Multitarget Tracking: an Automotive Application", The International Journal of Robotics Research, Jan. 2006, pp. 19-30, retrieved from the Internet: <https://hal.inria.fr/inria-00182004/document>, [retrieved Apr. 12, 2016] (13 pages).
Baumann et al., "Occlusion-Free Path Planning with a Probabilistic Roadmap", IEEE, International Conference on Intelligent Robots and Systems, 2008, retrieved from the Internet: <http://www.cs.ubc.ca/~little/links/linked-papers/OcclusionFreePathPlanning_final.pdf>, [retrieved Apr. 12, 2016] (6 pages).
Wikipedia, "Ray tracing (graphics)", retrieved from the Internet: <https://en.wikipedia.org/wiki/Ray_tracing_(graphics)>, [retrieved Apr. 12, 2016] (10 pages).
Pfaff et al., "An Efficient Extension of Elevation Maps for Outdoor Terrain Mapping", Department of Computer Science, University of Freiburg, Germany, undated (12 pages).
Pepik et al., "Occlusion Patterns for Object Class Detection", CVPR, 2013, pp. 3286-3293 (8 pages).
Heckman et al., "Potential Negative Obstacle Detection by Occlusion Labeling", IEEE/RSJ International Conference on Intelligent Robots and Systems, Oct. 29-Nov. 2, 2007, pp. 2168-2173 (6 pages).
Xiang et al., "Object Detection by 3D Aspectlets and Occlusion Reasoning", ICCV, 2013, pp. 530-537 (8 pages).
Hsiao et al., "Coherent Occlusion Reasoning for Instance Recognition", The Robotics Institute, Carnegie Mellon University, Pittsburgh, PA, 2013 (5 pages).
Douillard et al., "A 3D Laser and Vision Based Classifier", Australian Centre for Field Robotics, Sydney, Australia, 2009 (6 pages).
Lindner et al., "Multi-view point cloud fusion for LiDAR based cooperative environment detection", Advances in Radio Science, 2015, pp. 209-215 (7 pages).
Er et al., "Perception of Dynamic Environments in Autonomous Robots", Proceedings of the 17th World Congress, The International Federation of Automatic Control, Seoul, Koreal, Jul. 6-11, 2008, pp. 8226-8231 (6 pages).
Biswas, "Hybrid Markov / Non-Markov Localization for Long-Term Autonomy of Mobile Robots in Varying Indoor Environments", The Robotics Institute, Carnegie Mellon University, Pittsburgh, PA, Thesis Proposal, undated (83 pages).
Teichman et al., "Towards 3D Object Recognition via Classification of Arbitrary Object Tracks", IEEE International Conference on Robotics and Automation, Shanghai International Conference Center, May 9-13, 2011, pp. 4034-4041 (8 pages).
Felzenszwalb et al., "Efficient Graph-Based Image Segmentation", International Journal of Computer Vision, 2004, pp. 167-181 (15 pages).
Nguyen, "Constructing Drivability Maps From 3D Laser Range Data for Autonomous Vehicles", retrieved from the Internet: <ftp://ftp.cs.utexas.edu/pub/techreports/TR-1942.pdf>, retrieved Sep. 9, 2015, (17 pages).
Kuthirummal et al., "A Graph Traversal based Algorithm for Obstacle Detection using Lidar or Stereo", IEEE/RSJ International Conference on Intelligent Robots and Systems, Sep. 25-30, 2011, San Fransisco, CA, USA, pp. 3874-3880 (7 pages).

\* cited by examiner

DETECTION OF OVERHANGING OBJECTS

FIELD

The subject matter described herein relates in general to vehicles having an autonomous operational mode and, more particularly, to the operation of such vehicles in environments in which objects overhang a road.

BACKGROUND

Some vehicles include an operational mode in which a computing system is used to navigate and/or maneuver the vehicle along a travel route with minimal or no input from a human driver. Such vehicles are equipped with sensors that are configured to detect information about the surrounding environment, including the presence of objects in the environment. The computing systems are configured to process the detected information to determine how to navigate and/or maneuver the vehicle through the surrounding environment. The presence of some objects may affect the determination of how to navigate and/or maneuver the vehicle through the surrounding environment.

SUMMARY

In one respect, the present disclosure is directed to a method of detecting overhanging objects in an external environment of an autonomous vehicle. The method can include identifying one or more floating obstacle candidates based on sensor data acquired from at least a forward portion of the external environment. The method can include filtering out the identified one or more floating obstacle candidates based on one or more predefined parameters to remove false positives. The method can also include determining a driving maneuver for the autonomous vehicle at least partially based on a height clearance between the autonomous vehicle and the floating obstacle candidate(s) that remain after being filtered out. The method can further include causing the autonomous vehicle to implement the determined driving maneuver.

In another respect, the present disclosure is directed to a system for detecting overhanging objects in an external environment of an autonomous vehicle. The system can include a sensor system. The sensor system can be configured to acquire sensor data of at least a forward portion of the external environment of the autonomous vehicle. A processor can be operatively connected to the sensor system. The processor can be programmed to initiate executable operations. The executable operations can include identifying one or more floating obstacle candidates based on the acquired sensor data of at least a forward portion of the external environment. The executable operations can also include filtering out the identified one or more floating obstacle candidates based on one or more predefined parameters to remove false positives. The executable operations can further include determining a driving maneuver for the autonomous vehicle at least partially based on a height clearance between the autonomous vehicle and the floating obstacle candidates that remain after being filtered out. The executable operations can include causing the autonomous vehicle to implement the determined driving maneuver.

In still another respect, the present disclosure is directed to a computer program product for detecting overhanging objects in an external environment of an autonomous vehicle. The computer program product includes a computer readable storage medium having program code embodied therein. The program code is executable by a processor to perform a method. The method can include identifying one or more floating obstacle candidates based on sensor data acquired from at least a forward portion of the external environment. The method can include filtering out the identified one or more floating obstacle candidates based on one or more predefined parameters to remove false positives. The method can also include determining a driving maneuver for the autonomous vehicle at least partially based on a height clearance between the autonomous vehicle and floating obstacle candidates that remain after being filtered out. The method can further include causing the autonomous vehicle to implement the determined driving maneuver.

DETAILED DESCRIPTION

Figure 1:
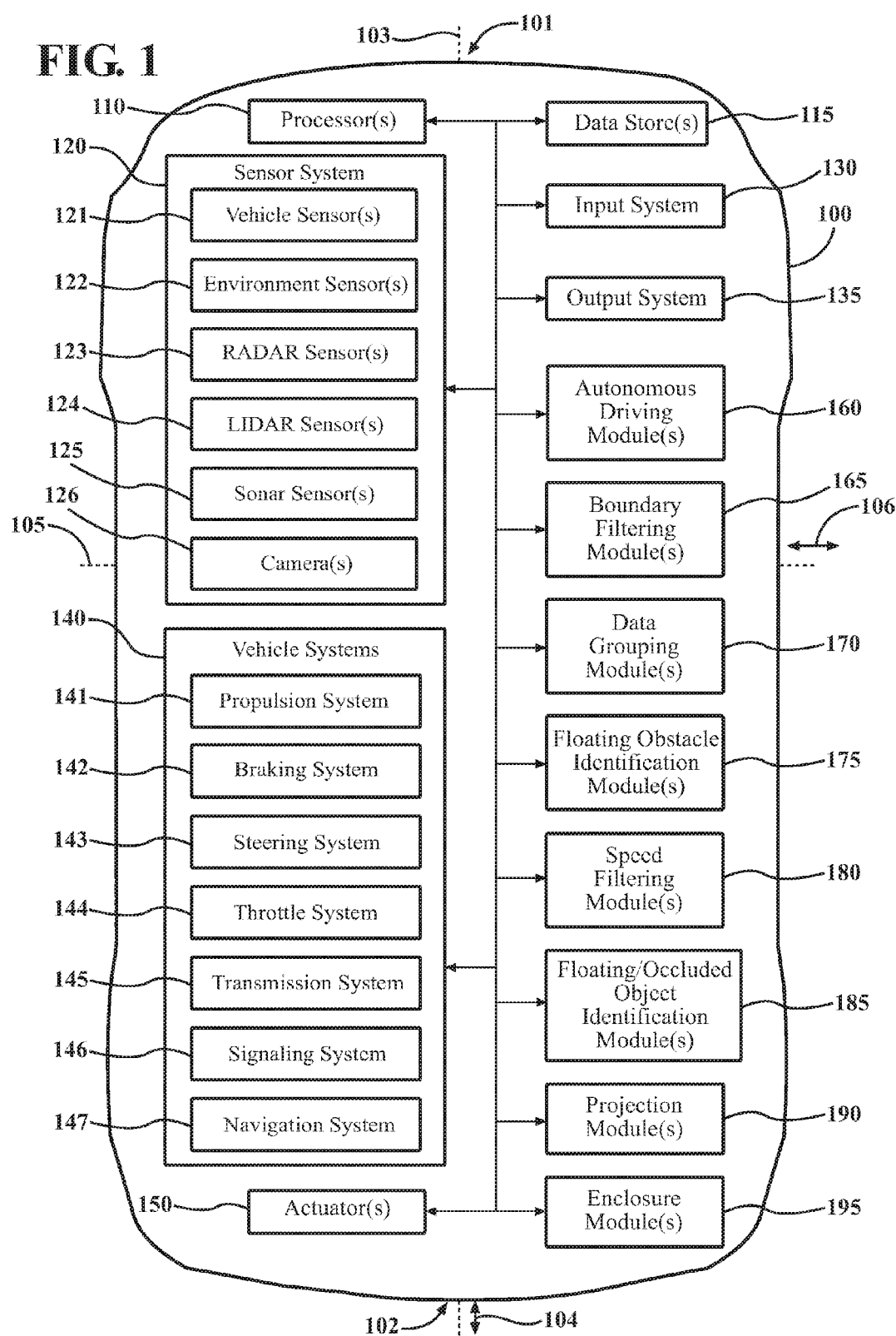
FIG. 1 is an example of an autonomous vehicle configured to detect overhanging objects.

This detailed description relates to the detection of overhanging objects located in an environment external of an autonomous vehicle. Based on sensor data acquired from at least a forward portion of an external environment of the autonomous vehicle, one or more floating obstacle candidates can be identified. The identified one or more floating obstacle candidates can be filtered out based on one or more predefined parameters to remove false positives. Examples of such parameters can include a predetermined speed threshold and/or the nature of the floating obstacle candidate (e.g., an actual floating object or an occluded object). A driving maneuver for the autonomous vehicle can be determined at least partially based on a height clearance between the autonomous vehicle and floating obstacle candidates that remain after being filtered out. The present detailed description relates to systems, methods and computer program products that incorporate one or more of such features. In at least some instances, such systems, methods and computer program products can improve safety and/or performance of an autonomous vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of a vehicle 100 is shown. As used herein, "vehicle" means any form of motorized transport. In one or more implementations, the autonomous vehicle 100 can be an automobile. While arrangements will be described herein with respect to automobiles, it will be understood that embodiments are not limited to automobiles. In some implementations, the autonomous vehicle 100 may be a watercraft, an aircraft or any other form of motorized transport.

According to arrangements herein, the autonomous vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the autonomous vehicle 100 can be highly automated or completely automated. In some instances, the autonomous vehicle 100 can be configured to be selectively switched between an autonomous mode and a manual mode. Such switching can be implemented in any suitable manner, now known or later developed. "Manual mode" means that all or a majority of the navigation and/or maneuvering of the vehicle along a travel route is performed by a human driver.

The autonomous vehicle 100 can have a forward end 101 and a rearward end 102. The autonomous vehicle 100 can have an associated longitudinal axis 103, which can be the central axis of the autonomous vehicle 100. The autonomous vehicle 100 can have an associated longitudinal direction 104. "Longitudinal direction" means any direction that is substantially parallel to and/or co-linear with the longitudinal axis 103. The autonomous vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The autonomous vehicle 100 can have an associated lateral direction 106. "Lateral direction" means any direction that is substantially parallel to and/or co-linear with the lateral axis 105.

The autonomous vehicle 100 can include various elements, some of which may be a part of an autonomous driving system. Some of the possible elements of the autonomous vehicle 100 are shown in FIG. 1 and will now be described. It will be understood that it is not necessary for the autonomous vehicle 100 to have all of the elements shown in FIG. 1 or described herein. The autonomous vehicle 100 can have any combination of the various elements shown in FIG. 1. Further, the autonomous vehicle 100 can have additional elements to those shown in FIG. 1. In some arrangements, the autonomous vehicle 100 may not include one or more of the elements shown in FIG. 1. Further, while the various elements are shown as being located within the autonomous vehicle 100 in FIG. 1, it will be understood that one or more of these elements can be located external to the autonomous vehicle 100. Further, the elements shown may be physically separated by large distances.

The autonomous vehicle 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor(s) 110 can be a main processor of the autonomous vehicle 100. For instance, the processor(s) 110 can be an electronic control unit (ECU).

The autonomous vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data. The map data can include maps of one or more geographic areas. The map data can include information or data on roads, traffic control devices, road markings, structures, features, and/or landmarks in the one or more geographic areas. The map data can be in any suitable form. In some instances, the map data can include aerial views of an area. In some instances, the map data can include ground views of an area, including 360 degree ground views. The map data can include measurements, dimensions, distances, and/or information for one or more items included in the map data and/or relative to other items included in the map data. The map data can include terrain data. The terrain data can include information about the terrain of one or more geographic areas. The terrain data can include elevation data in the one or more geographic areas. The map data can include a digital map with information about road geometry. The map data can be high quality and/or highly detailed.

In some instances, at least a portion of the map data can be located in one or more data stores 115 located onboard the autonomous vehicle 100. Alternatively or in addition, at least a portion of the data can be located in a data store or source that is located remote from the autonomous vehicle 100. The data can be obtained by the autonomous vehicle 100 in any suitable manner, or it can be provided by an entity (e.g., a vehicle manufacturer) for use by the autonomous vehicle 100.

The autonomous vehicle 100 can include a sensor system 120. The sensor system 120 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or other element of the autonomous vehicle 100 (including any of the elements shown in FIG. 1). The sensor system 120 can acquire data of at least a portion of the external environment of the autonomous vehicle 100.

The sensor system 120 can include any suitable type of sensor. Various examples of different types of sensors will be described herein. However, it will be understood that the embodiments are not limited to the particular sensors described.

The sensor system 120 can include one or more vehicle sensors 121. The vehicle sensor(s) 121 can be configured to detect, determine, assess, monitor, measure, quantify and/or sense information about the autonomous vehicle 100 itself. In one or more arrangements, the vehicle sensor(s) 121 can be configured to detect, determine, assess, monitor, measure, quantify and/or sense position and orientation changes of the autonomous vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, determine, assess, monitor, measure, quantify, and/or sense one or more characteristics of the autonomous vehicle 100. In one or more arrangements, the vehicle sensor(s) 121 can include a speedometer (not shown). The speedometer can determine a current speed of the autonomous vehicle 100, or data acquired by the speedometer can be used to determine a current speed of the autonomous vehicle 100.

Alternatively or in addition, the sensor system 120 can include one or more environment sensors 122 configured to acquire, detect, determine, assess, monitor, measure, quantify and/or sense driving environment data. "Driving environment data" includes and data or information about the external environment in which an autonomous vehicle is located or one or more portions thereof. For example, the one or more environment sensors 122 can be configured to detect, determine, assess, monitor, measure, quantify and/or sense objects in at least a portion of the external environment of the autonomous vehicle 100 and/or information/data about such objects. Such objects may be stationary objects and/or dynamic objects. The one or more environment sensors 122 can be configured to detect, determine, assess, monitor, measure, quantify and/or sense other things in the external environment of the autonomous vehicle 100, such as, for example, lane markers, signs, traffic lights, traffic signs, lane lines, crosswalks, curbs proximate the autonomous vehicle 100, off-road objects, etc. In one or more arrangements, the one or more environment sensors 122 can include a global navigation satellite system (GNSS), a global positioning system (GPS), a navigation system (which can be navigation system 147 described below), and/or other suitable sensors.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123. "Radar sensor" means any device, component and/or system that can detect, determine, assess, monitor, measure, quantify and/or sense something using at least in part radio signals. The one or more radar sensors 123 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g. in the longitudinal direction 104, the lateral direction 106 and/or other direction(s)),—the elevation of each detected object, the speed of each detected object and/or the movement of each detected object. The one or more radar sensors 123, or data obtained thereby, can determine the speed of objects in the external environment of the autonomous vehicle 100. Three dimensional coordinate information can be associated with the data acquired by the one or more radar sensors 123.

In one or more arrangements, the sensor system 120 can include one or more LIDAR sensors 124. "LIDAR sensor" means any device, component and/or system that can detect, determine, assess, monitor, measure, quantify and/or sense objects using at least in part lasers. The LIDAR sensor can include a laser source and/or laser scanner configured to emit a laser signal and a detector configured to detect reflections of the laser signal. The one or more LIDAR sensors 124 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g. in the longitudinal direction 104, the lateral direction 106 and/or other direction(s)), the elevation of each detected object, the speed of each detected object, and/or the movement of each detected object.

In one or more arrangements, the sensor system 120 can include one or more sonar sensors 125. "Sonar sensor" means any device, component and/or system that can detect, determine, assess, monitor, measure, quantify and/or sense something using at least in part sound waves. The one or more sonar sensors 125 can be configured to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions (e.g.

in the longitudinal direction 104, the lateral direction 106 and/or other direction(s)), the elevation of each detected object, the speed of each detected object, and/or the movement of each detected object.

The sensor system 120 can include can include one or more cameras 126. "Camera" includes any device(s), component(s), and/or system(s) that is configured to capture visual data. "Visual data" includes video and/or image information/data. The visual data can be in any suitable form. In one or more arrangements, one or more of the cameras 126 can be oriented, positioned, configured, operable, and/or arranged to capture visual data from at least a portion of the external environment of the autonomous vehicle 100. Visual data acquired by the one or more cameras 126 can be used to detect, determine, assess, monitor, measure, quantify and/or sense, directly or indirectly, the presence of one or more objects in the external environment of the autonomous vehicle 100, the position of each detected object relative to the autonomous vehicle 100, the distance between each detected object and the autonomous vehicle 100 in one or more directions, the elevation of each detected object, the speed of each detected object, and/or the movement of each detected object.

The one or more cameras 126 can be high resolution cameras. The high resolution can refer to the pixel resolution, the spatial resolution, spectral resolution, temporal resolution and/or radiometric resolution. In one or more arrangements, the one or more cameras 126 can be high dynamic range (HDR) cameras or infrared (IR) cameras. The one or more cameras 126 can capture visual data in any suitable wavelength on the electromagnetic spectrum.

The sensor system 120, the processor(s) 110, and/or one or more other elements of the autonomous vehicle 100 can be operable to control movements of one or more of the sensors of the sensor system 120. It should be noted that any of the sensors described herein can be provided in any suitable location with respect to the autonomous vehicle 100. For instance, one or more sensors can be located within the autonomous vehicle 100, one or more sensors can be located on the exterior of the autonomous vehicle 100 and/or one or more sensors can be located so as to be exposed to the exterior of the autonomous vehicle 100.

Alternatively or in addition to one or more of the above examples, the sensor system 120 can include one or more sensors configured to detect, determine, assess, monitor, measure, quantify and/or sense the location of the autonomous vehicle 100 and/or the location of objects in the environment relative to the autonomous vehicle 100. Any suitable sensor can be used for such purposes. Such sensors may work independently and/or in combination with a positioning system of the autonomous vehicle 100.

The autonomous vehicle 100 can include an input system 130. An "input system" includes any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The autonomous vehicle 100 can include an output system 135. An "output system" includes any device, component, system, element or arrangement or groups thereof that enable information/data to be presented to a vehicle occupant (e.g. a person, a vehicle occupant, etc.). The output system 135 can present information/data to a vehicle occupant. The output system 135 can include a display. Alternatively or in addition, the output system 135 may include a microphone, earphone and/or speaker. Some components of the autonomous vehicle 100 may serve as both a component of the input system 130 and a component of the output system 135.

The autonomous vehicle 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The autonomous vehicle 100 can include one or more autonomous driving modules 160. The autonomous driving module(s) 160 can be implemented as computer readable program code that, when executed by a processor, implement various processes, some of which will be described herein. The autonomous driving module(s) 160 can receive data from the sensor system 120 and/or any other type of system capable of capturing information relating to the autonomous vehicle 100 and/or the external environment of the autonomous vehicle 100. In one or more arrangements, the autonomous driving module(s) 160 can use such data to generate one or more driving scene models. The autonomous driving module(s) 160 can determine position and velocity of the autonomous vehicle 100. The autonomous driving module(s) 160 can determine the location of obstacles, objects, or other environmental features including traffic signs, trees, shrubs, neighboring vehicles, pedestrians, etc.

The autonomous driving module(s) 160 can be configured to receive, capture, and/or determine location information for objects within the external environment of the autonomous vehicle 100 for use by the processor(s) 110, and/or one or more of the modules described herein to estimate position and orientation of the autonomous vehicle 100, vehicle position in global coordinates based on signals from a plurality of satellites, or any other data and/or signals that could be used to determine the current state of the autonomous vehicle 100 or determine the position of the autonomous vehicle 100 in respect to its environment for use in either creating a map or determining the position of the autonomous vehicle 100 in respect to map data.

The autonomous driving module(s) 160 can be configured to determine travel path(s), current autonomous driving maneuvers for the autonomous vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the autonomous vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the autonomous vehicle 100 or one or more systems thereof (e.g. one or more of vehicle systems 140).

The autonomous vehicle 100 can include one or more boundary filtering modules 165. The boundary filtering module(s) 165 can be configured to filter out data acquired or collected by the sensor system 120 to remove (or otherwise ignore) object data points that are not located within one or more predefined boundaries. As an example, the one or more boundaries can include one or more lateral boundaries of the road. The lateral boundary of the road can be defined in any suitable manner. For instance, the lateral boundary of the road can be defined by one or more road markers (e.g., lane marker, curb, median, shoulder, etc.). Alternatively, the lateral boundary of the road can be defined by a predetermined lateral distance from a road marker. As an example, a lateral boundary can be defined as about 1 meter or about 2 meters in the lateral direction from an outermost lane marker of a road.

The boundary filtering module(s) 165 can be operatively connected to obtain map data for the driving environment of the vehicle, including a forward portion of the driving environment. As an example, the map data can be included in the one or more data stores 115. The acquired object data points can be compared to the map data. If an object data point is located outside of the one or more predefined lateral boundaries, the object data point can be filtered out. If an object data point is located within the one or more predefined lateral boundaries, the object data point is not filtered out.

In some instances, the one or more boundaries can include a height boundary. The height boundary can correspond to a highest point of the vehicle in the elevation direction (e.g., a direction into and out of the page in FIG. 1). In some instances, the height boundary can correspond to a highest point of the autonomous vehicle 100 plus a predetermined safety distance. As will be explained in detail later, if an object data point is located outside of the one or more predefined height boundary, the object data point can be filtered out. If an object data point is located within the one or more predefined height boundaries, the object data point is not filtered out.

The autonomous vehicle 100 can include one or more data grouping modules 170. The data grouping module(s) 170 can be configured to analyze data acquired by the sensor system 120, such as the object data points acquired by the LIDAR sensor(s) 124, to group object data points together to identify one or more obstacle candidates. In one or more arrangements, the data grouping module(s) 170 can be configured to group the object data points, as filtered out by the boundary filtering module(s) 165, to identify one or more obstacle candidates. The data grouping module(s) 170 can use any suitable grouping technique. As an example, the data grouping module(s) 170 can be configured to use one or more segmentation techniques, such as a graph-based segmentation algorithm. Some examples of suitable techniques to segment three dimensional point clouds into clusters are described in an article entitled "Efficient Graph-Based Image Segmentation" by P. Felzenszwalb et al., which is incorporated herein by reference. In one or more arrangements, such analyzing can be performed after the data points have been filtered out by the boundary filtering module(s) 165.

The autonomous vehicle 100 can include one or more floating obstacle candidate identification modules 175. The floating obstacle candidate identification module(s) 175 can be configured to analyze the obstacle candidates to identify floating obstacle candidates. A "floating obstacle candidate" is an object in the external environment of the vehicle based on acquired sensor data (e.g., grouped object data points) that is spaced from the ground in the substantially vertical direction. In one or more arrangements, the floating obstacle candidate can be any obstacle that is spaced from the ground by at least a minimum predetermined distance. If an obstacle candidate is not spaced from the ground, the obstacle candidate is not a floating obstacle candidate. In such case, the obstacle candidate can be filtered out, though such an obstacle candidate may considered with respect to other driving maneuvers for the autonomous vehicle 100. If an obstacle candidate is spaced from the ground, the obstacle candidate can be identified as a floating obstacle candidate. In such case, the floating obstacle candidate is not filtered out.

The autonomous vehicle can include one or more modules to filter out false positives from the floating obstacle candidates. The autonomous vehicle 100 can include any suitable number and/or type of such modules. The false positives can be filtered out according to one or more parameters.

For instance, the autonomous vehicle 100 can include one or more obstacle speed filtering modules 180. The obstacle speed filtering module(s) 180 can be configured to associate speed data with the one or more floating obstacle candidates. Such speed data can be obtained from any suitable source, such as the sensor system 120 and, more particularly, the one or more radar sensors 123. The obstacle speed filtering module(s) 180 can be configured to filter out the floating obstacle candidates to remove (or otherwise ignore) floating obstacle candidates that, based on the associated speed data, are moving at or above a predetermined speed threshold. The predetermined speed threshold can have any suitable value. As an example, the predetermined speed threshold can be about 1 meter per second. However, it will be understood that arrangements described herein are not limited to this speed threshold, as other values are possible for the speed threshold.

Alternatively or in addition, the autonomous vehicle 100 can include one or more floating/occluded obstacle filtering modules 185. The floating/occluded obstacle filtering module(s) 185 can be configured to determine whether a floating obstacle candidate is actually a floating object or whether it is an object that is occluded by another object. In some instances, an obstacle candidate may appear to be a floating object based on sensor data because a portion of the object is occluded. For instance, when the autonomous vehicle 100 is traveling up an inclined road, the road itself may block a portion of an object located on a substantially horizontal portion of the road ahead. In such case, the object can appear to be a floating object because only the upper portion of the object can be detected by the sensor system 120, as the lower portion is occluded by the road. The floating/occluded obstacle filtering module(s) 185 can make such a determination using any suitable technique, now known or later developed. For instance, the floating/occluded obstacle filtering module(s) 185 can use terrain data and/or visual data for to assess whether a floating obstacle candidate is actually a floating obstacle or an occluded object. If a floating obstacle candidate is determined to be an occluded object or if the floating/occluded obstacle filtering module(s) 185 cannot determine whether the floating obstacle candidate is a floating object or an occluded object, the floating obstacle candidate can be treated as another vehicle or other in-road object. In such case, the obstacle candidate can be filtered out from consideration as a floating object, and it can be assessed by the autonomous driving module(s) 160 and/or other module(s) as appropriate. If a floating obstacle candidate is determined to be a floating obstacle, the obstacle candidate can be identified as a floating obstacle. In such case, the floating obstacle is not filtered out.

The autonomous vehicle can include one or more projection modules 190. The projection module(s) 190 can be configured to manipulate object data points and/or other sensor data associated with the floating obstacle candidates. For instance, the projection module(s) 190 can be configured to project the three dimensional object data points associated with a floating obstacle candidate onto selected two dimensional planes for further analysis by one or more elements of the autonomous vehicle 100. For instance, the projection module(s) 190 can be configured to project three dimensional object data points onto a plane that includes the ground level. Alternatively or in addition, the projection module(s) 190 can be configured to project three dimensional object data points onto a plane that is substantially perpendicular to the travel direction of the autonomous vehicle 100. The projection module(s) 190 can perform such projections using any suitable technique, now known or later developed.

The autonomous vehicle 100 can include one or more enclosure modules 195. The enclosure module(s) 195 can be configured to fit a shape about the object data points (e.g., the projected object data points) to define the outer boundaries of an object. The enclosure module(s) 195 can be configured to fit or define a shape representing the autonomous vehicle 100. The enclosure module(s) 195 can fit any suitable shape about the object data points. For instance, in one or more arrangements, the enclosure module(s) 195 can be configured to fit a convex hull or a bounding box about the projected data points. The enclosure module(s) 195 can fit shapes using any suitable technique, now known or later developed. The fitted shape can be used to determine whether the autonomous vehicle 100 will collide with an object, as represented by the enclosed object data points.

The autonomous vehicle 100 can include one or more vehicle systems 140. Various examples of the one or more vehicle systems 140 are shown in FIG. 1. However, the autonomous vehicle 100 can include more, fewer, or different vehicle systems. It should be appreciated that although particular vehicle systems are separately defined, each or any of the systems or portions thereof may be otherwise combined or segregated via hardware and/or software within the autonomous vehicle 100. The autonomous vehicle 100 can include a propulsion system 141, a braking system 142, a steering system 143, throttle system 144, a transmission system 145, a signaling system 146, and/or a navigation system 147. Each of these systems can include one or more mechanisms, devices, elements, components, systems, and/or combination thereof, now known or later developed The navigation system 147 can include one or more mechanisms, devices, elements, components, systems, applications and/or combinations thereof, now known or later developed, configured to determine the geographic location of the autonomous vehicle 100 and/or to determine a travel route for the autonomous vehicle 100. The navigation system 147 can include one or more mapping applications to determine a travel route for the autonomous vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the autonomous vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the autonomous vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the autonomous vehicle 100 by controlling one or more of the vehicle systems 140 and/or components thereof. For instance, when operating in an autonomous mode, the processor(s) 110 and/or the autonomous driving module(s) 160 can control the direction and/or speed of the autonomous vehicle 100. The processor(s) 110 and/or the autonomous driving module(s) 160 can cause the autonomous vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The autonomous vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

According to arrangements described herein, the autonomous vehicle 100 can be configured to acquire sensor data of a forward portion of an external environment. More particularly, the autonomous vehicle 100 can sense a forward portion of the external environment using the sensor system 120. The data acquired by the sensor system 120 can be processed (e.g., filtering, grouping, etc.) to identify one or more floating object candidates in the forward portion of the external environment. In one or more arrangements, the autonomous vehicle 100 can be configured to process the floating obstacle candidates to filter out false positive floating objects (e.g., objects that may appear to be a floating object of concern, but are not actually of concern). The autonomous vehicle 100 can take into account the presence of such objects and/or the size of such objects with respect to determining driving maneuvers.

Figure 2:
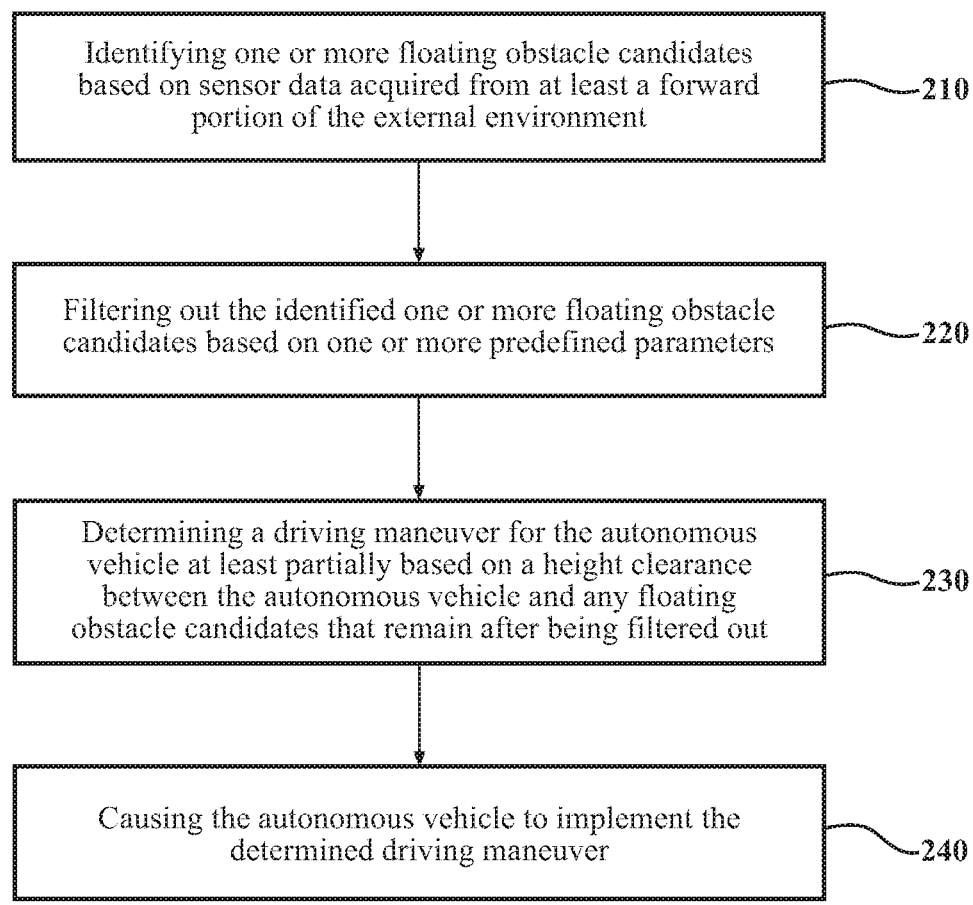
FIG. 2 is an example of a method of detecting overhanging objects for an autonomous vehicle.

Now that the various potential systems, devices, elements and/or components of the autonomous vehicle 100 have been described, various methods of operating an autonomous vehicle will now be described. Referring now to FIG. 2, an example of a method of detecting overhanging objects in an external environment of an autonomous vehicle is shown. Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, one or more floating obstacle candidates can be identified based on sensor data acquired from at least a forward portion of the external environment. The identifying of the floating obstacle candidates can be performed by any suitable element or combination of elements of the autonomous vehicle 100. In one or more arrangements, the identifying of the floating obstacle candidates can be performed, at least in part, by the floating obstacle candidate identification module 175 and/or the processor(s) 110. The method 200 can continue to block 220.

At block 220, the identified one or more floating obstacle candidates can be filtered out based on one or more predefined parameters. The filtering out of the identified floating obstacle candidates can be performed by any suitable element or combination of elements of the autonomous vehicle 100. In one or more arrangements, the filtering out of the identified floating obstacle candidates can be performed, at least in part, by one or more false positive filtering modules (e.g., the obstacle speed filtering module(s) 180, the floating/occluded obstacle filtering module(s) 185, etc.) and/or the processor(s) 110. The method 200 can continue to block 230.

At block 230, a driving maneuver for the autonomous vehicle 100 can be determined at least partially based on a height clearance between the autonomous vehicle 100 and the remaining one or more floating obstacle candidates after the floating obstacle candidates are filtered out. Such determining can be performed by any suitable element or combination of elements of the autonomous vehicle 100. In one or more arrangements, the determining can be performed, at least in part, by the autonomous driving module(s) 160, the projection module(s) 190, the enclosure module(s) 195, and/or the processor(s) 110.

In one or more arrangements, determining the driving maneuver can include determining whether the autonomous vehicle 100 will collide with any of the remaining floating obstacle candidates (e.g., after being filtered out) based at least on a current driving path of the autonomous vehicle 100 and the height clearance of the remaining floating obstacle candidates. If it is determined that the autonomous vehicle 100 will collide with one or more of the remaining floating obstacle candidates, the determined driving maneuver can include a lateral movement (e.g., a lane shift or a lane change) of the autonomous vehicle 100. However, if it is determined that the autonomous vehicle 100 will not collide with the remaining floating obstacle candidates, the determined driving maneuver can include maintaining the current driving path of the autonomous vehicle 100. The method 200 can continue to block 240.

At block 240, the autonomous vehicle 100 can be caused to implement the determined driving maneuver. The autonomous vehicle 100 can be caused to implement the determined driving maneuver in any suitable manner. In one or more arrangements, the processor(s) 110 and/or the autonomous driving module(s) 160 can cause the autonomous vehicle 100 to implement the driving maneuver. The processor(s) 110 and/or the autonomous driving module(s) 160 can be operatively connected to one or more of the vehicle systems 140 to implement the determined driving maneuver. In one or more arrangements, the processor(s) 110 and/or the autonomous driving module(s) 160 can be operable to control the one or more actuators 150, which can control one or more of the vehicle systems 140 or portions thereof to implement the determined driving maneuver.

It should be noted that causing the driving maneuver to be implemented can be performed automatically. In one or more arrangements, a vehicle occupant (e.g. a driver and/or other passenger) can be prompted to provide permission to implement the driving maneuver. The vehicle occupant can be prompted in any suitable manner. For instance, a prompt can be presented on a display within the autonomous vehicle 100. Alternatively or in addition, the prompt can be audibly output to the vehicle occupant over one or more audial channels. Other forms of prompting can be used as an alternative or in addition to the above-described forms of prompting. Responsive to receiving an input corresponding to a vehicle occupant's approval to implement the driving maneuver, the autonomous vehicle 100 can be caused to implement the driving maneuver. In some instances, the driving maneuver can be implemented only if it is determined to be safe to do so. To that end, the autonomous vehicle 100 can consider the current driving environment, the road, adjacent lanes, other objects, etc.

When the autonomous vehicle 100 is caused to implement the driving maneuver, the method 200 can end. Alternatively, the method 200 can return to block 210 or some other block. As a further alternative, the method 200 can include additional and/or alternative blocks (not shown).

Figure 3:
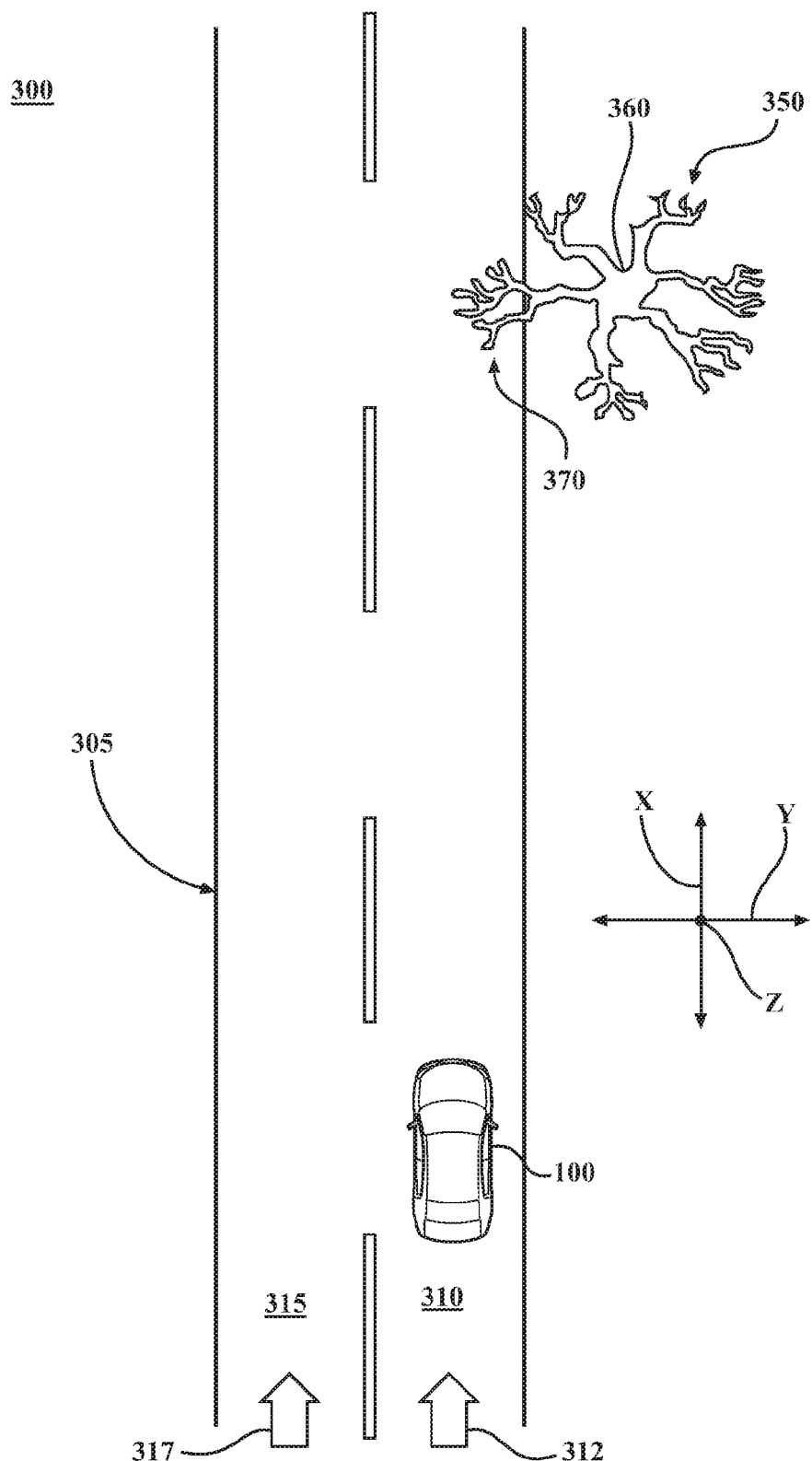
FIG. 3 is a view of an environment that includes an object overhanging a portion of a road.
Figure 4:
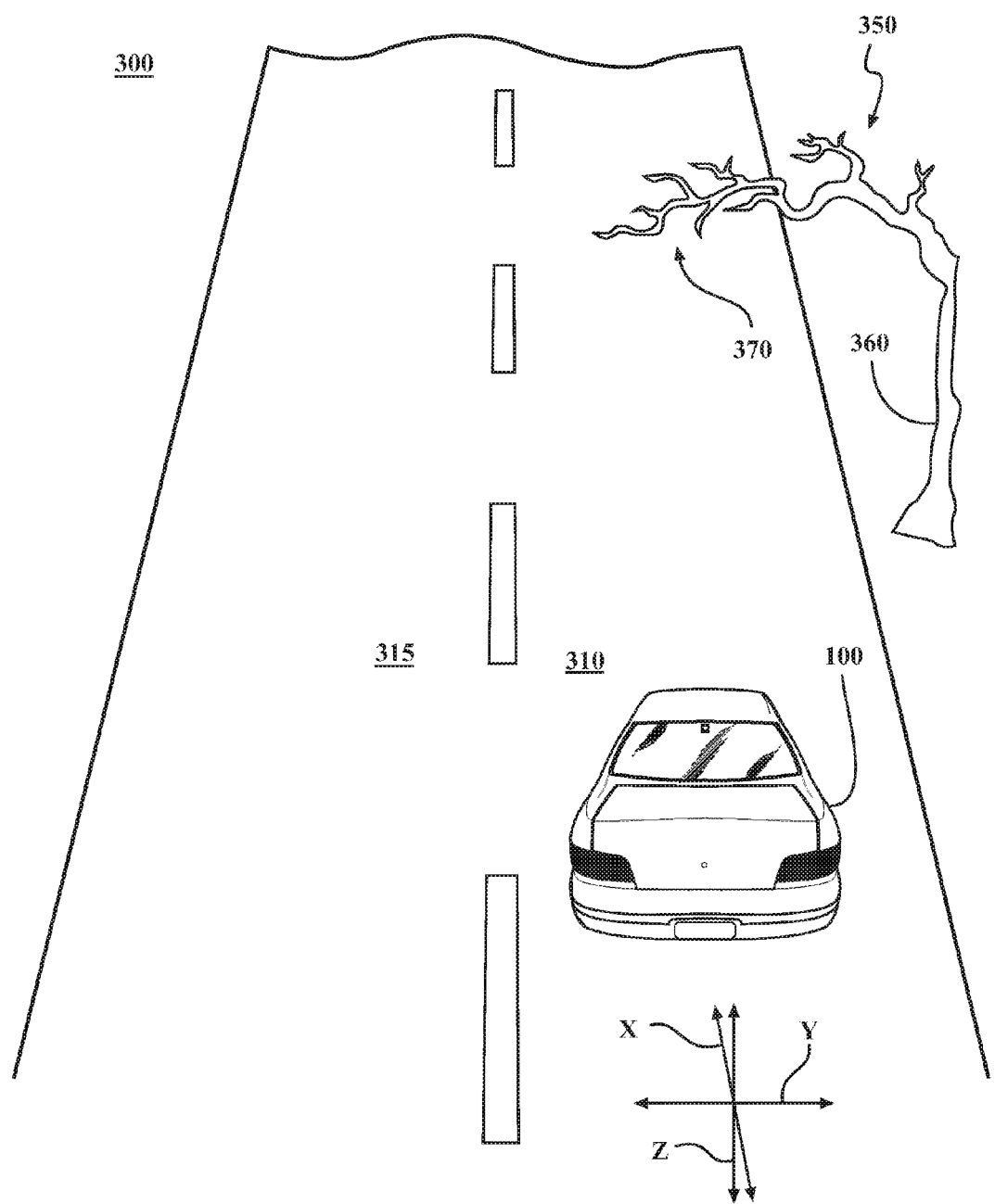
FIG. 4 is another view of the environment that includes the object overhanging a portion of the road.

Non-limiting examples of the operation of the autonomous vehicle 100 and/or the method 200 will now be described in relation to FIGS. 3-4. For purposes of these examples, the autonomous vehicle 100 can be traveling in an environment 300, which is an external environment of the autonomous vehicle 100. The autonomous vehicle 100 can be traveling on a road 305. "Road" means a thoroughfare, route, path or way between two places and upon which a vehicle can travel. The road 305 may be paved or otherwise improved to facilitate travel by a vehicle thereon. In some instances, the road 305 may be unpaved or undeveloped. The road 305 may be a public road or a private road. The road 305 can include or be a part of one or more bridges, tunnels, supporting structures, junctions, crossings, interchanges, and toll roads.

In the example shown, the road 305 can include a first travel lane 310 and a second travel lane 315. A "travel lane" is a portion of a road that is designated for use by a single line of vehicles and/or a portion of a road that is being used by a single line of vehicles. In some instances, the one or more travel lanes 310, 315 can be designated by markings on the road 305 or in any other suitable manner. In some instances, the one or more travel lanes 310, 315 may not be marked. The road 305 can be designated for one way travel or two way travel. In the example shown, the first travel lane 310 can have an associated first travel direction 312, and the second travel lane 315 can have an associated second travel direction 317. In this example, the first travel direction 312 can be substantially the same as the second travel direction 317. However, in other examples, the first travel direction 312 can be different from the second travel direction 317.

There can be one or more objects 350 in the external environment 300. At least a portion of the one or more objects 350 can overhang a portion of the road 305. For instance, the object 350 can be a tree 360. The tree 360 can be located outside of the boundaries of the road 305. However, one or more branches 370 of the tree 360 can overhang the first travel lane 310. While this example is described in connection with the overhanging object being a tree, it will be understood that arrangements described herein are not limited to trees. Indeed, the one or more objects 350 can be almost any structure that overhangs at least a portion of the road 305. Examples such objects include an above ground walkway, a bridge, an overpass, a tunnel, and/or a building (e.g. a parking garage, a building with parking beneath the building, etc.), just to name a few possibilities.

The current travel lane of the autonomous vehicle 100 can be the first travel lane 310. The autonomous vehicle 100 can sense the external environment 300, such as by using the sensor system 120 (e.g., the LIDAR sensor(s) 124). More particularly, the autonomous vehicle 100 can sense at least a forward portion of the external environment. The autonomous vehicle 100 can sense a forward portion of the external environment 300. The autonomous vehicle 100 can detect the presence of one or more objects located in the forward environment (e.g., a parked vehicle).

The forward portion of the external environment 300 includes the tree 360. The sensing of the forward portion of the external environment 300 can be performed by one or more sensors of the sensor system 120. For instance, the sensing of the forward portion of the external environment 300 can be performed using one or more LIDAR sensors 124 and one or more radar sensors 123. The driving environment data acquired by the one or more LIDAR sensors 124 can include a plurality of object data points. The plurality of object data points may form one or more three dimensional point clouds. One of the point clouds can include points from the tree 360.

The acquired object data points can be filtered out to remove (or otherwise ignore) points located outside of a boundary. In this example, points that are located outside of a road boundary (e.g., a curb, lane marker, etc.) plus a predetermined distance from the road boundary. In one or more arrangements, such filtering out of the acquired object data points to points can be performed by the boundary filtering module 165. The boundary filtering module 165 can use and/or access map data (e.g., map data included in one or more data stores 115 or other suitable location) to perform such filtering out. Object data points that are located outside of the predetermined boundary can be filtered out. Removing such object data points can help to streamline the processes described herein and can reduce false alarms, as such object data point are unlikely to be pertinent to the operation of the autonomous vehicle 100. In this example, object data points associated with the trunk of the tree 360 can be filtered out, but object data points associated with the overhanging branches 370 can remain.

The filtered object data points can be grouped to identify one or more obstacle candidates. Such grouping can be performed in any suitable manner. In one or more arrangements, the grouping of the filtered out object data points can be performed by the data grouping module(s) 170 and/or the processor(s) 110. As an example, the filtered object data points can be plotted on a graph. Point clustering can be performed by the data grouping module(s) 170 and/or the processor(s) 110 on the plotted object data points. Generally, in point clustering, data points are grouped together based on their detected location so that like points are grouped together to form clusters. In this example, the points from the overhanging branches 370 will form a cluster that is floating above the ground. The points will appear this way because the points associated with the rest of the tree 360 has been filtered out due to its location outside of the road boundary. From these point clusters, one or more floating obstacle candidates can be identified. In this example, a floating obstacle candidate would include a point cluster formed based on the object data points associated with the overhanging branches 370 of the tree 360.

The autonomous vehicle 100 (e.g., the sensor system 120, the processor(s) 110, and/or other module(s)) can be configured to associate data obtained by the LIDAR sensor(s) 124 (e.g., point data, point clusters) with data obtained by data obtained by the radar sensor(s) 123. Such association of the sensor data can provide more complete information about the driving environment and the objects therein. The association can be made based on or more suitable factors. For example, the association can be made if the data points obtained by the LIDAR sensor(s) 124 and the data points acquired by the radar sensor(s) 123 are located within a predetermined distance from each other.

The identified one or more floating obstacle candidates can be filtered out based on one or more predefined parameters to remove false positive floating obstacle candidates (e.g., obstacles candidates that are not actually floating objects). Any floating obstacle candidates that remain after the filtering out can be classified as being a floating obstacle.

Any suitable parameter(s) can be used. As an example, the identified one or more floating obstacle candidates can be filtered out based on speed data associated with the one or more floating obstacle candidates. The obstacle speed filtering module can be configured to filter out the obstacle candidates to remove obstacle candidates relative to a predetermined speed threshold. The predetermined speed threshold can have any suitable value. As an example, the predetermined speed threshold can be about 1 meter per second. However, it will be understood that other values are possible.

In one or more arrangements, if the speed data associated with a floating obstacle candidate is above the predetermined speed threshold, then the floating object can be classified as being another vehicle or other object with a missing detection of its lower portion. In such case, the floating obstacle candidate can be determined to be a false positive and, therefore, filtered out. If the speed data associated with a floating obstacle candidate is below the predetermined speed threshold, then the floating object can be classified as a floating obstacle candidate. The filtering out based on speed data can be performed by, for example, the processor(s) 110 and/or the obstacle speed filtering module(s) 180. In this example, the speed of the overhanging branch 370 can be zero or near zero. As a result, the overhanging branch 370 can be classified as a floating obstacle and is not filtered out.

In some instances, additional filtering out of the floating obstacle candidates can be performed according to other predefined parameters. For instance, the identified one or more floating obstacle candidates can be filtered out based on whether the floating obstacle candidate is an occluded objects. In some instances, it may be possible that the obstacle candidate appears to be floating because a portion of the object is occluded by the ground. Such a scenario may occur where the autonomous vehicle 100 is driving up an inclined road. In such case, a forward vehicle may appear to be a floating object because the lower portion of the forward vehicle may be occluded by the road and only the upper portion of the forward vehicle is detected by the sensor system 120. However, in this example, the road 305 can be substantially horizontal. As a result, the floating obstacle of the overhanging branch 370 is determined to be not occluded and, therefore, is not filtered out.

After the filtering out, the remaining floating object candidates can be classified as an overhanging objects. The vehicle can determine whether any driving maneuvers are need to avoid a collision with the overhanging object. In this example, one or more collision checks can be performed, such as a height clearance check and a lateral clearance check.

With respect to the height clearance check, the three dimensional object data points associated with the overhanging object can be projected to the plane that is substantially perpendicular to the driving direction of the autonomous vehicle 100. With respect to FIGS. 3 and 4, such a plane would be defined as the Y-Z plane. The object data points can be projected in the Y-Z plane by the projection module 190.

An enclosure can be formed around the object data points. The enclosure can be a virtual enclosure. Any suitable enclosed can be formed. For instance, in one or more arrangements, a convex hull can enclose the projected points. Also, an enclosure can be formed to represent the autonomous vehicle 100. The formation of the enclosures can be performed by the enclosure module 195. It can be determined where there is an overlap between the enclosure of the projected object data points and the enclosure or other representation of the autonomous vehicle 100. In one or more arrangements, the lowest point of the convex hull associated with the floating object can be compared to the highest point of the autonomous vehicle 100. If there is sufficient clearance for the autonomous vehicle 100 to pass under the floating object, then the autonomous vehicle 100 can continue its current driving maneuver or trajectory without modification. In such case, the lateral clearance check does not need to be performed.

However, if there is not sufficient clearance for the autonomous vehicle 100 to pass under the floating object, then the lateral clearance check can be performed. The lateral clearance check can be performed in any suitable manner. For example, in one or more arrangements, the object data points that are located at a higher elevation than the highest point of the autonomous vehicle 100 (or the convex hull or other enclosure of the autonomous vehicle) can be filtered out. The remaining object data points can be projected onto the ground plane. With respect to FIGS. 3 and 4, such a plane would be defined as the X-Y plane. The object data points can be projected in the Y-Z plane by the projection module 190.

An enclosure can be formed about the projected points. Any suitable enclosure can be formed. For instance, in one or more arrangements, a convex hull can enclose the projected object data points. A driving maneuver for the autonomous vehicle can be determined at least partially based on the enclosure to avoid a collision therewith. The driving maneuver can be determined by, for example, the autonomous driving module(s) 160 and/or the processor(s) 110. The driving maneuver can be any suitable driving maneuver or group of driving maneuvers. For instance, the driving maneuver can include moving the autonomous vehicle 100 in the lateral direction 106 away from the predicted laterally innermost or outermost point of the floating object relative to the autonomous vehicle 100. In some instances, such lateral movement can include changing travel lanes. In some instances, such lateral movement can include traveling on the shoulder of the road. The presence of other vehicles on the road 305 can be taken into account when determining the driving maneuvers.

The autonomous vehicle 100 can be caused to implement the determined driving maneuver. The processor(s) 110 and/or the autonomous driving module(s) 160 can be operatively connected to one or more of the vehicle systems 140 to implement the determined driving maneuver. In one or more arrangements, the processor(s) 110 and/or the autonomous driving module(s) 160 can be operable to control the one or more actuators 150, which can control one or more of the vehicle systems 140 or portions thereof to implement the determined driving maneuver.

It will be appreciated that arrangements described herein can provide numerous benefits, including one or more of the benefits mentioned herein. For example, arrangements described herein can improve the performance and/or safety of an autonomous vehicle. Arrangements described here can facilitate the smooth operation of an autonomous vehicle in environments with overhanging objects. Arrangements described herein can avoid or minimize sudden, unnecessary, and/or drastic vehicle actions (e.g., lane shifts, lane changes or vehicle stops) due to the presence of one or more overhanging objects. Arrangements described herein can provide an efficient manner of detecting overhanging objects. Arrangements described herein can determine appropriate driving maneuvers for the autonomous vehicle to avoid any detected overhanging objects.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of detecting overhanging objects in an external environment of an autonomous vehicle, the method comprising:
   identifying one or more floating obstacle candidates based on sensor data acquired from at least a forward portion of the external environment;
   filtering out the identified one or more floating obstacle candidates based on one or more predefined parameters;
   determining a driving maneuver for the autonomous vehicle at least partially based on a height clearance between the autonomous vehicle and floating obstacle candidates that remain after being filtered out; and
   causing the autonomous vehicle to implement the determined driving maneuver.

2. The method of claim 1, wherein the sensor data is a plurality of object data points, and wherein identifying one or more floating obstacle candidates based on sensor data acquired from at least a forward portion of the external environment includes:
   sensing at least the forward portion of the external environment to acquire the plurality of object data points;
   filtering out the acquired object data points to remove object data points located outside of one or more road boundaries of a current road of the autonomous vehicle; and
   grouping the acquired object data points that remain after being filtered out into one or more obstacle candidates, wherein the one or more floating obstacle candidates are identified from the one or more obstacle candidates.

3. The method of claim 2, wherein sensing at least a forward portion of the external environment to acquire the plurality of object data points is performed using one or more LIDAR sensors.

4. The method of claim 2, wherein filtering out the acquired object data points to remove object data points located outside of one or more road boundaries of the current road of the autonomous vehicle includes:
   locating the acquired object data points on a map, wherein the map includes the current road of the autonomous vehicle and the one or more road boundaries of the current road of the autonomous vehicle; and
   filtering out any object data points located laterally outside of the one or more road boundaries or located laterally outside of a predetermined distance from the one or more road boundaries.

5. The method of claim 2, wherein grouping the object data points that remain after being filtered out into one or more obstacle candidates includes point clustering the object data points that remain after being filtered out into one or more obstacle candidates.

6. The method of claim 1, wherein filtering out the identified one or more floating obstacle candidates based on one or more predefined parameters includes:
   sensing at least a forward portion of the external environment to acquire speed data of objects located therein;

associating the acquired speed data with the one or more floating obstacle candidates;

comparing the speed data associated with the one or more floating obstacle candidates to a predetermined speed threshold; and filtering out any of the floating obstacle candidates with associated speed data that is above the predetermined speed threshold.

7. The method of claim 6, wherein sensing at least a forward portion of the external environment to acquire speed data is performed using one or more RADAR sensors.

8. The method of claim 6, further including:

determining whether any floating obstacle candidate with associated speed data that is below the predetermined speed threshold is a floating object or an occluded object; and wherein, if the floating obstacle candidate is determined to be an occluded object, filtering out the occluded object so that it is not used in determining the driving maneuver for the autonomous vehicle at least partially based on the height clearance of the filtered out one or more floating obstacle candidates; and wherein, if the floating obstacle candidate is determined to be a floating object, determining the driving maneuver for the autonomous vehicle at least partially based on the height clearance includes determining the driving maneuver for the autonomous vehicle at least partially based on the height clearance of the floating object.

9. The method of claim 1, wherein determining the driving maneuver for the autonomous vehicle at least partially based on the height clearance between the autonomous vehicle and floating obstacle candidates that remain after being filtered out includes:

determining whether the autonomous vehicle will collide with one or more of the floating obstacle candidates that remain after being filtered out based at least on a current driving path of the autonomous vehicle and the height clearance between the autonomous vehicle and the floating obstacle candidates that remain after being filtered out, wherein, if it is determined that the autonomous vehicle will collide with one or more of the floating obstacle candidates that remain after being filtered out, the determined driving maneuver includes a lateral movement of the autonomous vehicle, wherein, if it is determined that the autonomous vehicle will not collide with one or more of the floating obstacle candidates that remain after being filtered out, the determined driving maneuver includes maintaining the current driving path of the autonomous vehicle.

10. The method of claim 9, wherein the lateral movement of the autonomous vehicle is one of a lane shift or a lane change.

11. The method of claim 9, wherein the sensor data is a plurality of object data points, further including:

projecting the object data points associated with floating obstacle candidates that remain after being filtered out onto a plane substantially perpendicular to a driving direction of the autonomous vehicle; and forming a first enclosure to around the projected object data points, wherein the height clearance of the filtered out one or more floating obstacle candidates is based at least partially on a height clearance between the autonomous vehicle and the first enclosure.

12. The method of claim 11, further including:

wherein, if it is determined that the autonomous vehicle will collide with one or more of the floating obstacle candidates that remain after being filtered out, filtering out the projected object data points that are located at a higher elevation than a height of the autonomous vehicle;

project the object data points that remain after being filtered out to a ground plane; and forming a second enclosure around the projected object data points on the ground plane, wherein the lateral movement of the autonomous vehicle is based on the second enclosure.

13. A system for detecting overhanging objects in an external environment of an autonomous vehicle, the system comprising:

a sensor system configured to acquire sensor data of at least a forward portion of the external environment of the autonomous vehicle; and a processor operatively connected to the sensor system, the processor being programmed to initiate executable operations comprising:

identifying one or more floating obstacle candidates based on the acquired sensor data of at least a forward portion of the external environment;

filtering out the identified one or more floating obstacle candidates based on one or more predefined parameters;

determining a driving maneuver for the autonomous vehicle at least partially based on a height clearance between the autonomous vehicle and of the floating obstacle candidates that remain after being filtered out; and causing the autonomous vehicle to implement the determined driving maneuver.

14. The system of claim 13, wherein the sensor data is a plurality of object data points, and wherein identifying one or more floating obstacle candidates based on sensor data acquired from at least a forward portion of the external environment includes:

sensing, using the sensor system, at least the forward portion of the external environment to acquire the plurality of object data points;

filtering out the acquired object data points to remove object data points located outside of one or more road boundaries of a current road of the autonomous vehicle; and grouping the object data points that remain after being filtered out into one or more obstacle candidates, wherein the one or more floating obstacle candidates are identified from the one or more obstacle candidates.

15. The system of claim 14, wherein filtering out the acquired object data points to remove object data points located outside of one or more road boundaries of a current road of the autonomous vehicle includes:

locating the object data points on a map, wherein the map includes the current road of the autonomous vehicle and the one or more road boundaries of the current road of the autonomous vehicle; and filtering out object data points located laterally outside of the one or more road boundaries or located laterally outside of a predetermined distance from the one or more road boundaries.

16. The system of claim 14, wherein the sensor system includes one or more LIDAR sensors, wherein the sensor data is a plurality of object data points, and wherein the one or more LIDAR sensors are configured to sense at least a forward portion of the external environment to acquire object data points.

17. The system of claim 14, wherein the sensor system includes one or more RADAR sensors, wherein the one or more RADAR sensors are configured to sense at least a forward portion of the external environment to acquire speed data for one or more objects located therein.

18. The system of claim 17, wherein filtering out the identified one or more floating obstacle candidates based on one or more predefined parameters includes:
    associating the acquired speed data with the one or more floating obstacle candidates;
    comparing the speed data associated with the one or more floating obstacle candidates to a predetermined speed threshold; and
    filtering out any of the floating obstacle candidates with associated speed data that is above the predetermined speed threshold.

19. The system of claim 18, further including:
    determining whether any floating obstacle candidate with associated speed data that is below the predetermined speed threshold is a floating object or an occluded object; and
    wherein, if the floating obstacle candidate is determined to be an occluded object, filtering out the occluded object so that it is not used in determining the driving maneuver for the autonomous vehicle at least partially based on the height clearance of the filtered out one or more floating obstacle candidates; and
    wherein, if the floating obstacle candidate is determined to be a floating object, determining the driving maneuver for the autonomous vehicle at least partially based on the height clearance between the autonomous vehicle and any floating obstacle candidates that remain after being filtered out includes determining the driving maneuver for the autonomous vehicle at least partially based on the height clearance of the floating object.

20. A computer program product for detecting overhanging objects in an external environment of an autonomous vehicle, the computer program product comprising a non-transitory computer readable storage medium having program code embodied therein, the program code executable by a processor to perform a method comprising:
    identifying one or more floating obstacle candidates based on sensor data acquired from at least a forward portion of the external environment;
    filtering out the identified one or more floating obstacle candidates based on one or more predefined parameters;
    determining a driving maneuver for the autonomous vehicle at least partially based on a height clearance between the autonomous vehicle and floating obstacle candidates that remain after being filtered out; and
    causing the autonomous vehicle to implement the determined driving maneuver.

* * * * *